Sept. 9, 1930.  C. L. STOKES  1,775,176
PNEUMATIC STEERING MECHANISM
Filed Dec. 4, 1924
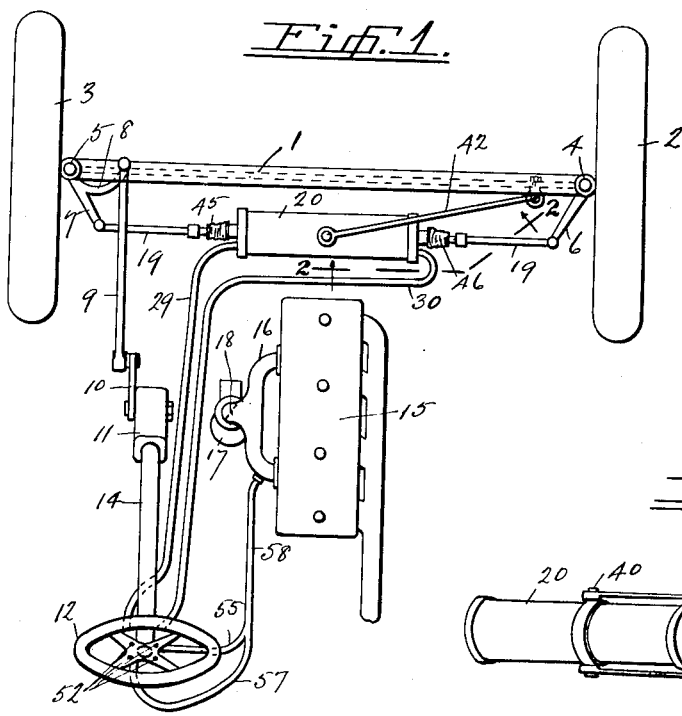
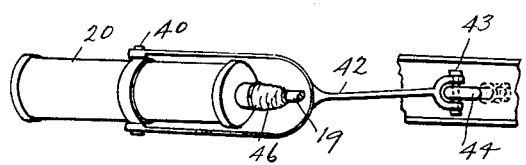
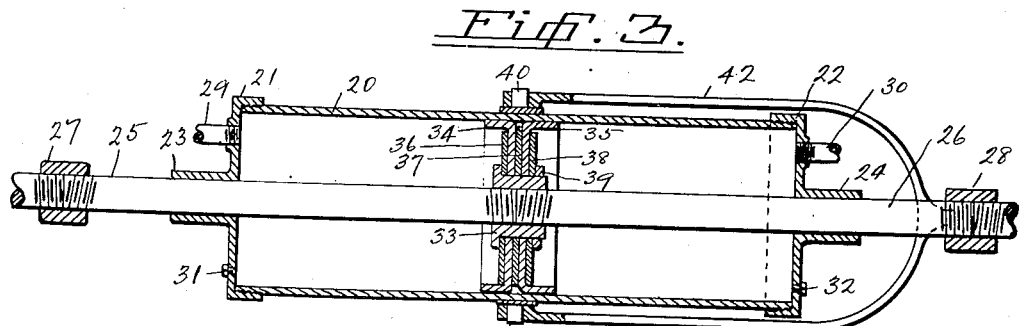
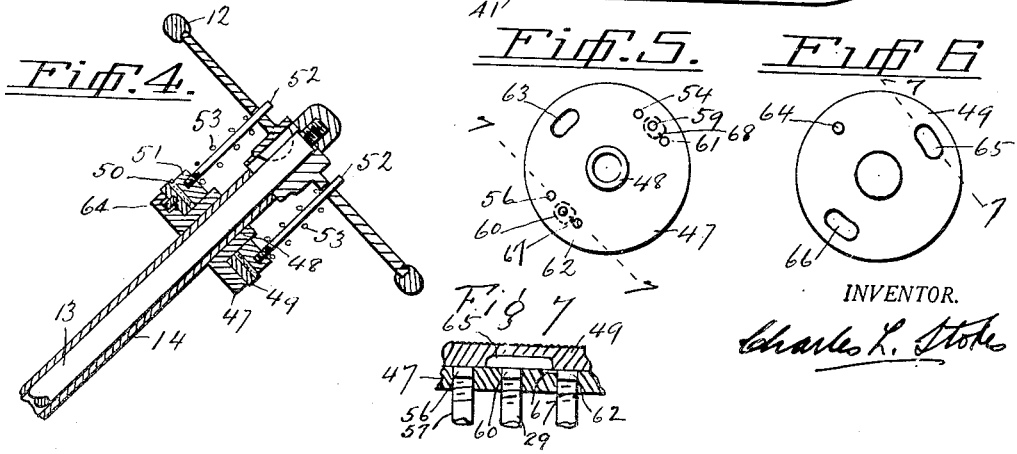
INVENTOR.
Charles L. Stokes Patented Sept. 9, 1930

1,775,176

UNITED STATES PATENT OFFICE

CHARLES LAWRENCE STOKES, OF LOS ANGELES, CALIFORNIA

PNEUMATIC STEERING MECHANISM

Application filed December 4, 1924. Serial No. 753,882.

My invention relates to improvements in pneumatic steering mechanisms for self-propelled vehicles.

The principal object of my invention is to provide improved means for utilizing fluid pressure generated in the engine in an automobile for assisting the steering of the same.

A further object of my invention is to utilize the engine induction vacuum for operating my improved mechanism.

In general the object of my invention is to provide improved apparatus for use in connection with the generic invention disclosed in a patent application by Charles L. Stokes and Charles F. Lienesch filed May 20, 1924, S. N. 714,602.

Referring to the drawings in which the same numbers indicate like parts:—

Fig. 1 is a view of a conventional steering arrangement in an automobile showing the relative positions of my improvements.

Fig. 2 is a view along the lines 2—2 of Fig. 1.

Fig. 3 is a sectional view of my specific improvements.

Fig. 4 is a sectional view of the control for operating the device shown in Fig. 3.

Fig. 5 is a plan of part of Fig. 4.

Fig. 6 is a plan of part of Fig. 4.

Fig 7 is a sectional view along the lines 7—7 shown in Figs. 5 and 6 when the same are placed face to face and in position on the steering column as shown in Fig. 4.

In Fig. 1 the front axle 1 of an automobile supports the front wheels 2 and 3 on spindles (not shown) pivoted respectively at 4 and 5. To the pivots 4 and 5 are joined respectively the steering arms 6 and 7 which are connected usually by a single piece of metal tubing called a tie rod. One steering arm 7 is suitably bent in part at 8 to be connected by a drag link 9 to a steering arm 10 which is operated through a gear train in gear box 11 by the rotation of the steering wheel 12 which actuates the steering shaft 13 inside of the steering column 14.

So far as described the steering arrangements mentioned are typically conventional and it is to be strictly understood that my invention is applicable to any form of steering mechanism for turning the front wheels of a vehicle in substantially parallel curves.

An internal combustion engine is shown at 15 having an inlet manifold 16, a 'r- buretor 17, and a throttle 18 for controlling the passage of liquid fuel and air from the carburetor 17 to the engine 15.

In the present instance, instead of the conventional single tie rod connecting the steering arms 6 and 7, I provide a tie rod 19 out of which a central portion is cut to receive a cylinder 20 the ends of which are closed by caps 21 and 22 which respectively have central bosses 23 and 24 through which are adapted to slide respectively piston rods 25 and 26 and the piston rods 25 and 26 are respectively firmly coupled to the two halves of the tie rod 19 by sleeves 27 and 28.

The caps 21 and 22 are provided with orifices in which are fixed pipes 29 and 30 respectively and are also provided with drain plugs 31 and 32 respectively. The piston rods 25 and 26 meet centrally of the cylinder 20, the ends of the piston rods 25 and 26 being firmly coupled by a threaded sleeve, the sleeve 33 on which is mounted reversely facing leather cups 34 and 35 suitably spaced and supported on 33 by means of washers 36, 37 and 38 the whole being compactly held in position on the boss 23 by a lock nut 39.

Centrally on the outside of the cylinder 20 on the upper and lower side are welded trunnions 40 and 41 adapted to hold the ends of a yoke 42 which is pivotally fastened to the axle 1 by a bolt 43 passing through an eye 44 which is bolted to the axle 1. A pair of accordeon leather boots 45 and 46 are fastened respectively to the bosses 23 and 24 and fastened respectively to the piston rods 25 and 26 for securely sheltering the same from access of dirt, etc. and also the same boots are capable of being filled with lubricant for the piston rods.

The pipes 29 and 30 lead from each end of the cylinder 20 to a control disc 47 which is firmly fastened on the steering column 14 a predetermined distance below the steering wheel 12 and the disc 47 is provided with a shoulder collar 48 surrounding the steering column 14. A floating disc 49 rests on the disc 47 and a leather clutch washer 50 rests on the disc 49. An actuating disc 51 rests on the washer 50 and has a series of studs 52 firmly fastened in the washer 51 at one end, the free ends thereof passing through holes in the steering wheel arms.

The series of discs enumerated are kept under greater or less pressure by springs 53 surrounding each of the studs 52. The disc 47 has a series of three holes on each side thereof for different connections. Hole 54 is connected to pipe 55, hole 56 is connected to pipe 57, and the pipes 55 and 57 are joined to a single pipe 58 for connection to the intake manifold 16 on the engine side of throttle 18.

Hole 59 is connected to pipe 30 which runs to one end of cylinder 20 and hole 60 is connected to pipe 29 which runs to the other end of the cylinder 20. Holes 61 and 62 are open to atmosphere.

A portion 63 is adapted to receive a dowel pin 64 firmly fastened in the disc 49 for limiting the movement thereof and the disc 49 contains a pair of grooves 65 and 66 for controlling the application of engine vacuum to the cylinder 20 when the disc 49 and the disc 47 are in position on the steering column 14.

This control is shown in Fig. 7 wherein the groove 65 is adapted when the automobile is in a straight ahead position to shut off the vacuum of the engine from pipe 56 and admit a small amount of air from the hole 62 to the hole 60 through a narrow channel 67 scored in the face of the disc 47, a similar action occurring with the groove 66, the holes 54, 59 and 61 by channel 68.

Thus it will be seen that groove 65 according to its movement will control the series of ports 56, 60 and 62 while the groove 66 will control the series of ports 54, 59 and 61 and thus the actuation of the mechanism in the cylinder 20 will be automatically governed according to the movement of the wheel 12, it being understood that the face of the disc 47 is grooved between the ports 59 and 61 in a similar manner to that shown in Fig. 7 between the holes 60 and 62 and it should be further noted that the upper surface of the disc 49 may be ridged or knurled, to avoid too great a slippage of the leather clutch washer 50.

The operation of the device is as follows:—

If the wheels 2 and 3 are straight ahead as shown in Fig. 1, and it is desired to turn to the right, the wheel 12 will be turned to the right whereupon the pressure of springs 53 will cause the discs 49 and 51 together with the washer 50 to turn to the right in which case the groove 65 will move to first cut off all access of air from the hole 62 to the hole 60 and will thereafter begin to apply engine vacuum from the hole 56 to the hole 60 which vacuum will then be applied through the pipe 29 to the left hand end of the cylinder 20.

At the same time the groove 66 will have been moved to more fully admit atmosphere from the hole 61 through the port 59 to the pipe 30 and the interior of the opposite end of the cylinder 20 so that a condition will occur whereby the left hand end of the cylinder 20 may be under a certain degree of vacuum whereas the other end of the cylinder 20 will be completely under atmospheric pressure. The result of this will be to force the tie rod 19 to the left and the wheels 2 and 3 to the right, the cylinder 20 being restrained from movement by the yoke 42.

The pressure thus developed in the cylinder 20 for forcing the tie rod 19 in one direction relieves the torque required to be applied through the steering wheel 12 and the regular steering mechanism to a minimum, or to any desired degree depending on the diameter of cylinder 20. When it is desired to then straighten the wheels 2 and 3 a reverse action to that described will take place, whereby on turning wheel 12 to the left, the left hand end of the cylinder 20 will open to atmosphere while the right hand end of the cylinder 20 will be evacuated and the air drawn therefrom to the engine manifold and cylinders.

It is to be specially noted that the action as described will absolutely prevent the collection of gasoline in the cylinder 20 because the cylinder 20, when the wheels are in a straight line position, will be normally under atmospheric pressure and thus when the cylinder 20 is evacuated at either end the flow of air will always run in a direction through the cylinder 20 towards the engine manifold and thus the collection of condensed gasoline vapor, or water vapor in the cylinder 20, cannot take place.

The yoke 42 is pivoted on the cylinder 20 and the axle 1 in order to maintain the cylinder 20 in an approximately central position because normally the tendency of the tie rod 19, when wheels 2 and 3 are turned, is to assume an angular position with respect to the axle 1 and not maintain a parallel position.

Many other ways of anchoring the cylinder 20 centrally and providing for the aforesaid angular movement are apparent to those skilled in the art and I do not limit myself to the structure shown except as set forth in the appended claims wherein

I claim:—

1. In steering mechanism for motor vehicles, a one piece tie rod, a cylinder through which said tie rod extends, a piston on said tie rod within said cylinder, and means pivotally connected to said cylinder for anchoring said cylinder to the chassis of said vehicle.

2. In steering mechanism for motor vehicles, a tie rod, a cylinder on said rod, a piston on said rod within said cylinder, and an anchoring member having one end pivotally connected to said cylinder, the opposite end of said member being provided with means for pivotally attaching the same to a fixed part of said vehicle.

3. In a power operated steering mechanism, a control disk adapted to be rigidly connected to the steering column of a motor vehicle, said disk being provided with a plurality of ports, a floating disk mounted on said first named disk and provided with grooves for covering and uncovering said ports, an actuating disk, means movable by said actuating disk for frictionally engaging said floating disk, and means for causing said actuating disk to move with a steering wheel whereby upon turning said steering wheel said ports may be covered and uncovered by the movement of said floating disk.

4. In a power operated steering mechanism, a control disk adapted to be secured to a steering column, said disk being provided with ports, means for connecting certain of said ports with the intake mechanism of an internal combustion engine and with the steering mechanism, a floating disk mounted on said control disk and provided with recesses forming passages for connecting and disconnecting said ports, an actuating disk, and means movable with said actuating disk for frictionally engaging said floating disk and adapted to be moved by the movement of the steering post.

5. In a motor vehicle, an axle, a pair of stub axles pivotally connected to said axle, wheels on said stub axles, steering arms rigidly connected to said stub axles, a rigid connecting member between said arms, steering mechanism including a steering wheel for moving said member for steering said wheels, power operated mechanism mounted on said member, means controlled by the movement of said steering wheel for operating said power operated mechanism to move said connecting member for assisting in steering said vehicle, and link means connected to said axle and to said mechanism, and movable relative to said axle for movably connecting said mechanism to said axle.

Signed at Wilmington, in the county of Los Angeles, and State of California, this 26th day of July A. D. 1924.

CHARLES LAWRENCE STOKES.